(12) United States Patent
Snyder et al.

(10) Patent No.: US 6,603,856 B1
(45) Date of Patent: Aug. 5, 2003

(54) CARRIER FOR A RADIOTELEPHONE

(75) Inventors: Matthew Snyder, Tokyo (JP); Ayako Yamazaki, Tokyo (JP); William Yau, Tokyo (JP)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/292,963

(22) Filed: Apr. 16, 1999

Related U.S. Application Data (63) Continuation of application No. 09/292,963, filed on Apr. 16, 1999, now Pat. No. 6,377,686.

(30) Foreign Application Priority Data

Apr. 16, 1998 (GB) .............................................. 9808021
Oct. 16, 1998 (GB) .............................................. 9822577

(51) Int. Cl.⁷ .................................................. H04M 1/00
(52) U.S. Cl. ........................................ 379/446; 379/454
(58) Field of Search ................................ 379/447, 446, 379/454, 455, 433.04; 455/90, 575; 224/150, 257

(56) References Cited

U.S. PATENT DOCUMENTS 2,533,493 A * 12/1950 Mitchell ...................... 455/90
3,495,770 A * 2/1970 Seltmann, Jr. et al. ...... 224/150
4,416,405 A * 11/1983 Caillouet ..................... 224/257
5,491,507 A * 2/1996 Umezawa et al. ..... 379/433.04
5,535,928 A 7/1996 Herring ....................... 224/250

FOREIGN PATENT DOCUMENTS

EP 0777371 6/1997 ............ H04M/1/05
JP 9298370 11/1997 ............ H05K/5/02
WO 9602978 2/1996 ............ H04B/1/38

* cited by examiner

Primary Examiner—Jack Chiang
(74) Attorney, Agent, or Firm—Antonelli, Terry, Stout & Kraus, LLP (57) ABSTRACT

The present invention provides a carrier for a handportable radiotelephone comprising handstrap means connectable to first and second ends of a radiotelephone and hanging means by which the carrier is releasably hangable, in a handsfree manner, from the user's accoutrements. Thereby, the present invention provides a suitable radiotelephone with dual mode support options. A first hand-carry mode, where the handstrap means provides auxiliary support to the telephone when the user holds the telephone in his hand in the normal way during a call. And, a second handsfree mode, where the hanging means is attached to the user's accoutrements when the phone is in an on-hook condition, for example. The user's accoutrements may include the user's belt, belt loop, bag or the like.

37 Claims, 7 Drawing Sheets

CARRIER FOR A RADIOTELEPHONE

This application is a continuation of application Ser. No. 09/292,963 filed Apr. 16, 1999, U.S. Pat. No. 6,377,686.

BACKGROUND OF THE INVENTION

The present invention relates to a carrier for a radiotelephone.

Over recent years, the size of a cellular telephones has decreased to the point where they may be said to be 'hand-held' or 'palm-held'.

It is known to provide these cellular telephones with a cord for carrying the telephone. The cord is threaded through holes in the housing of the telephone and then its ends joined to form an endless loop. The user is able to conveniently carry the telephone by the cord when it is not in use. Also, when using the telephone, the user may pass his hand through the loop of the cord such that it encircles his wrist. Should the telephone then slip or be knocked from the user's hand, the cord provides an auxiliary means of support and prevents drop damage to the telephone. Japanese patent specification JP 9-298370 shows an example of this approach.

The present invention is concerned with enabling the user to conveniently carry a radiotelephone in different ways according to the situation.

SUMMARY OF THE INVENTION

In one aspect, the present invention provides a carrier for a handportable radiotelephone comprising handstrap means connectable to first and second ends of a radiotelephone and hanging means by which the carrier is releasably hangable, in a handsfree manner, from the user's accoutrements.

The carrier of the present invention can provide a suitable radiotelephone with dual mode support. A first hand-carry mode, where the handstrap means provides auxiliary support to the telephone when the user holds the telephone in his hand in the normal way during a call. And, a second handsfree mode, where the hanging means is attached to the user's accoutrements when the phone is in an on-hook condition, for example. The user's accoutrements may include the user's belt, belt loop, bag or the like.

Preferably, the hanging means includes a hanging assembly, which can be removed from the carrier. The hanging assembly may comprise a connector comprising a first portion connected to the handstrap means and a second portion connected to an accoutrement-connection means. Preferably, the hanging means, or just the second portion of the connector and the accoutrement-connection means can be removed, whereby the carrier is reduced to a single mode configuration—with hand-carry capability only.

In another aspect of the invention, the present invention may provide a radiotelephone comprising a housing having first and second carrier attachment means disposed at first and second ends of the housing and a carrier, the carrier comprising handstrap means connected to the first and second carrier attachment means and hanging means by which the radiotelephone is releasably hangable, in a hands-free manner, from t he user's accoutrements.

BRIEF DESCRIPTION OF THE DRAWINGS

Exemplary embodiments of the invention are hereinafter with reference to the accompanying drawings, in which:

FIGS. 3(i–v) show the carrier of FIG. 2 attached to a radiotelephone in various configurations;

DETAILED DESCRIPTION OF THE INVENTION

Figure 1:
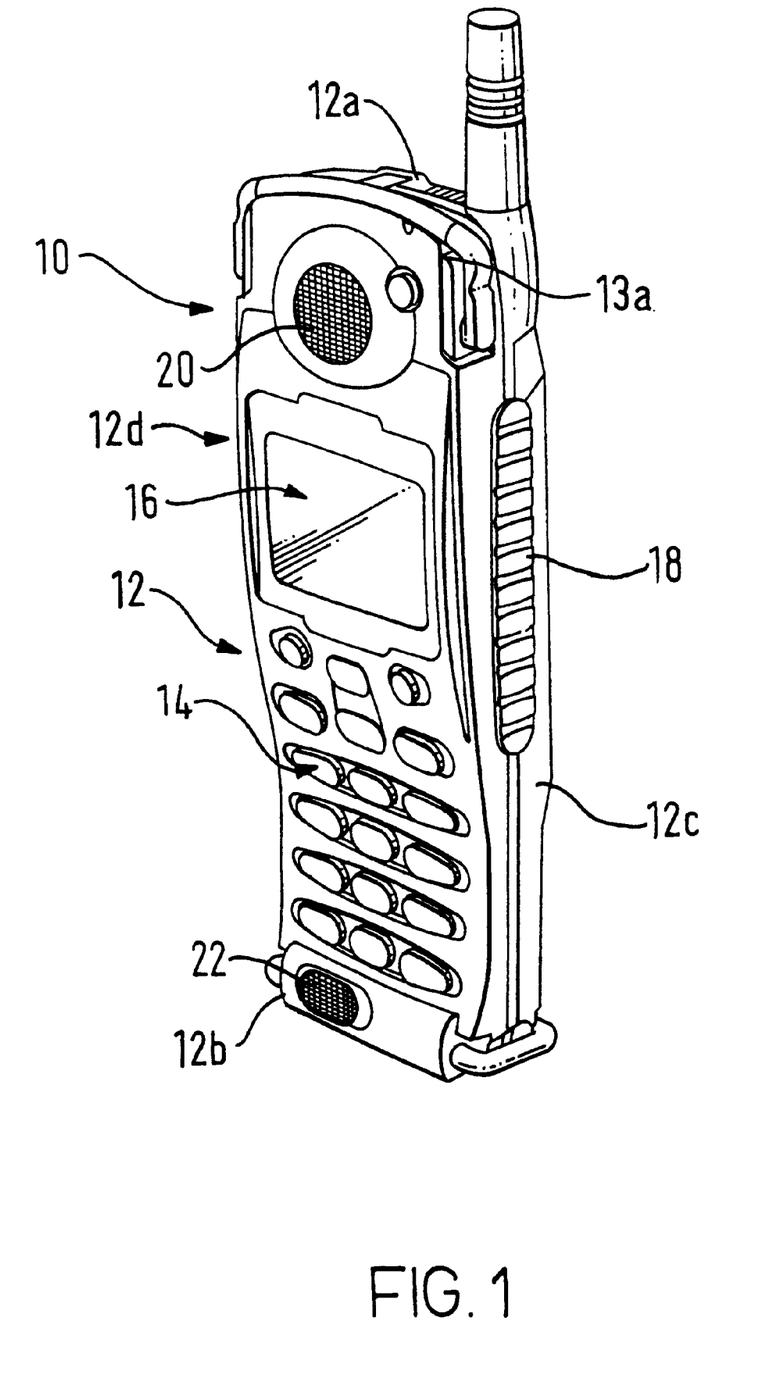
FIG. 1 shows a perspective view of a cellular telephone suitable for use with a carrier of the present invention.

FIG. 1 shows a cellular telephone which is generally designated 10. The internal components of the telephone 10 are located within housing 12 having a top end 12a, a bottom end 12b and sides 12c, 12d. In the top end 12a, a groove 13a is formed. In the bottom end 12b, a groove 13b (FIG. 3iv) is formed. Externally, the telephone 10 is provided with a keypad 14 and a display 16 as is conventional. Also, the telephone 10 is provided with grips 18 on the sides. The grips 18 are made from a non-slip, soft elastomer and are ribbed. The grips 18 are bonded to the housing 12 and provide some measure of side-impact protection. The telephone 10 is also provided with metal mesh speaker and microphone covers 20, 22 respectively. In contrast with conventional cellular telephones 10, which use unobstrusive and relatively small holes to convey sound to and from the audio transducers (microphone 19, speaker 21 in FIG. 4), the mesh covers enable a relatively large opening to the exterior of the telephone to be used without making it more likely that foreign bodies will find their way inside the telephone and without any associated style penalty. Because relatively large openings to the audio transducers are possible, the position of the user to the telephone 10 when making a call is not so critical—this particularly apparent with respect to the user's ear to speaker connection which benefits greatly from the greater speaker output catchment area.

The telephone 10 also comprises first and second attachment loops 30, 40 mounted to the housing 12 in the region of the top end 12a and in the region of the bottom end 12b, respectively. Each attachment loop comprises a bar 32 from each end of which an arm 36,38 extends generally orthogonally therefrom to define a generally 'C' shape loop. The attachment loops 30,40 are mounted to the housing 12 by hinge mechanisms.

Figure 6:
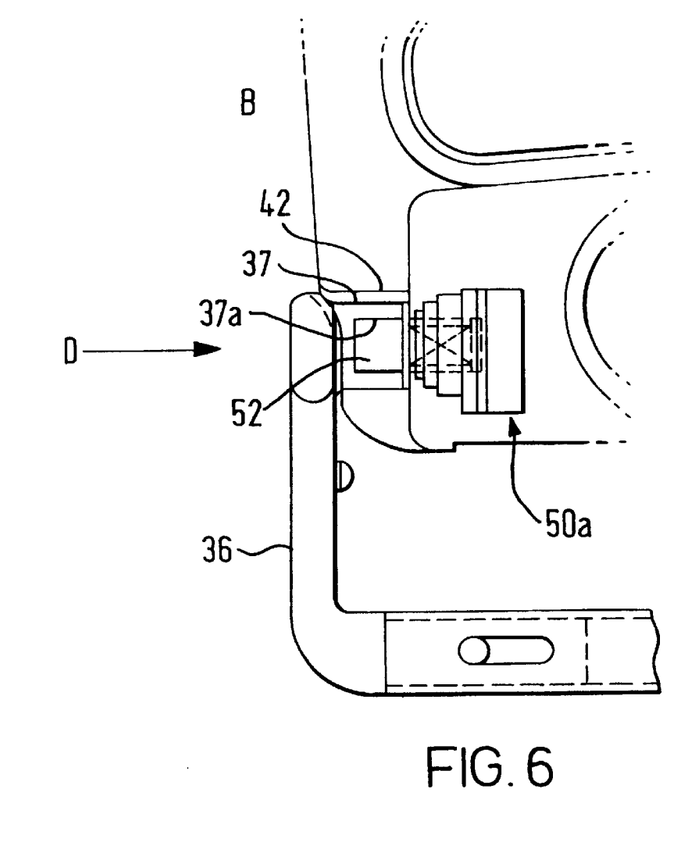
FIG. 6 shows the encircled portion B of FIG. 4 in enlarged form.

Referring first to the second attachment loop 40, this loop is attached to the housing 12 by a pair of hinge units 50a, 50b fixedly mounted within the housing, each hinge unit 50a, 50b being coupled to an arm of the second attachment loop 40. FIG. 6 shows the hinge unit 50a enclosed by circle B and its connection to arm 36 in close-up detail. (The situation at the other hinge unit 50b is identical.) The end of the arm 36 is provided with an inwardly directed cup portion 37 which projects through an opening 42 in the housing 12. The cup portion 37 includes a recess 37a. The hinge unit 50a is fixedly mounted adjacent the opening 42 and includes a shaft 52 which mates with the recess 37a. Referring back to FIG. 4, the hinge units 50a, 50b together permit the second attachment loop to be rotated about a fixed axis labelled FA.

Figure 4:
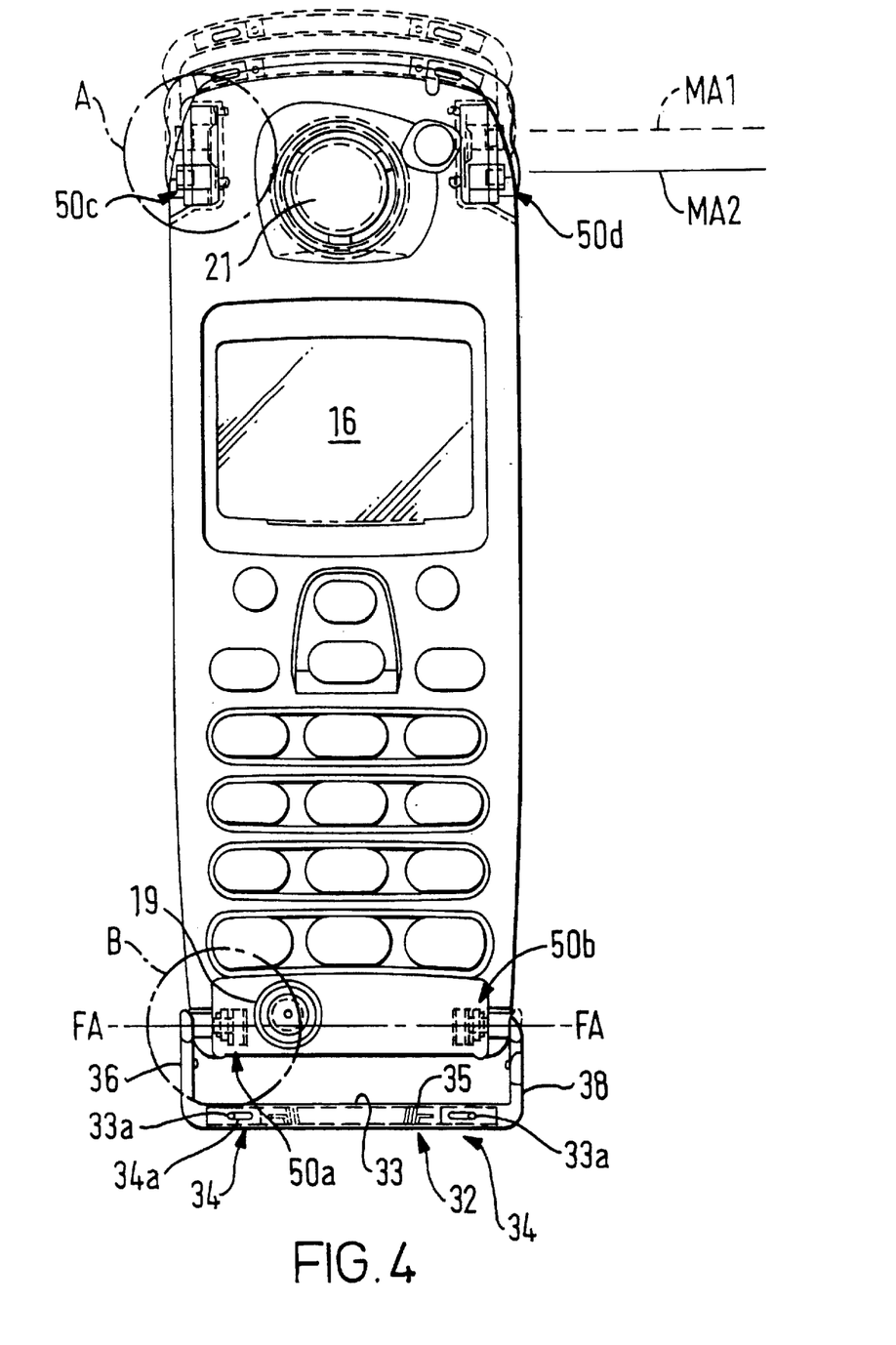
FIG. 4 shows the radiotelephone of FIG. 1 with some parts removed and some internal parts revealed.
Figure 5:
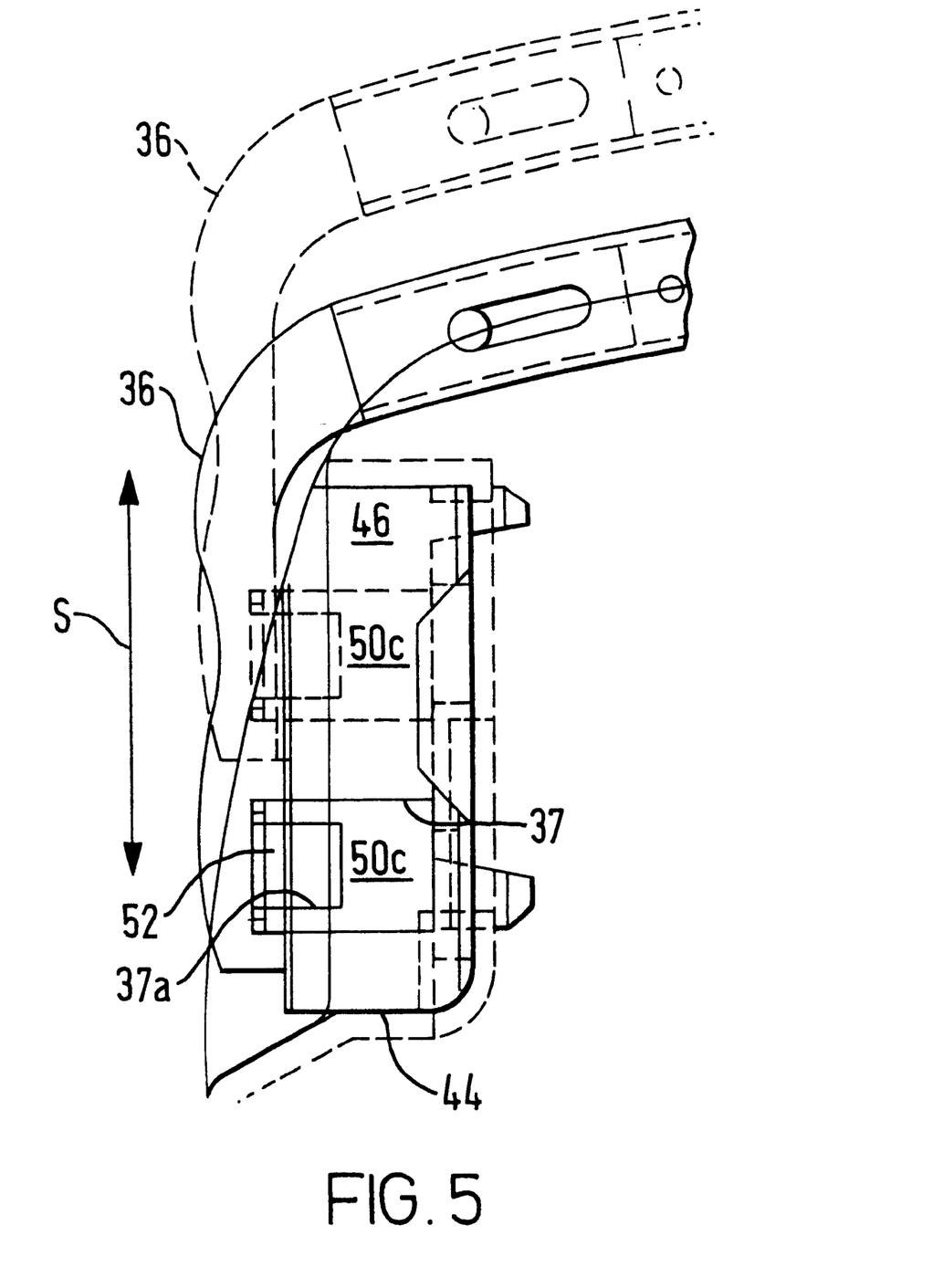
FIG. 5 shows the encircled portion A of FIG. 4 in enlarged form.

Referring now to the first attachment loop 30, this loop is attached to the housing 12 by a pair of hinge units 50c, 50d, each hinge unit 50c, 50d being coupled to an arm of the first attachment loop 40. FIG. 5 shows the hinge unit 50c enclosed by circle A and its connection to arm 36 in close-up detail. (The situation at the other hinge unit 50d is identical.) The end of the arm 36 is provided with an inwardly directed cup portion 37 which projects through an opening 44 in the housing 12. The cup portion 37 includes a recess 37a. The hinge unit 50c includes a shaft 52 which mates with the recess 37a. However, instead of being fixedly mounted within the housing 12, as are the hinge units 50a, 50b, the hinge unit 50c is mounted within a hinge carrier 46. The hinge carrier 46 sits in the opening 44 and permits the hinge unit 50c to slide back and forth within the carrier 46, as indicated by the double-headed arrow S. There is a tight fit between the hinge carrier 46 and the hinge unit 50c, such that the hinge unit 50c can be moved to any one of a number of positions within the hinge carrier 46 by the user and will remain in that position in the absence of a force applied by the user. This is illustrated in FIGS. 4 and 6, where the two extreme positions which the hinge unit 50c (and hinge unit 50d) can adopt are illustrated simultaneously. In continuous lines, the hinge unit 50c is shown occupying its lowermost position within the hinge carrier 46, whereby the bar 32 (in continuous lines) rests in a retracted, idle position within the groove 13a. In dotted lines, the hinge unit 50c is showing in its uppermost position within the hinge carrier 46, whereby the bar 32 (in dotted lines) stands proud from the top end 12a of the housing in an operational position. Since the hinge units 50c, 50d may be slid in this way, they together define a hinge mechanism having a movable hinge axis. The two extreme possible hinge axes, corresponding to the two illustrated positions of the hinge units 50c, 50d, are labeled MA1 and MA2 in FIG. 4.

Figure 7:
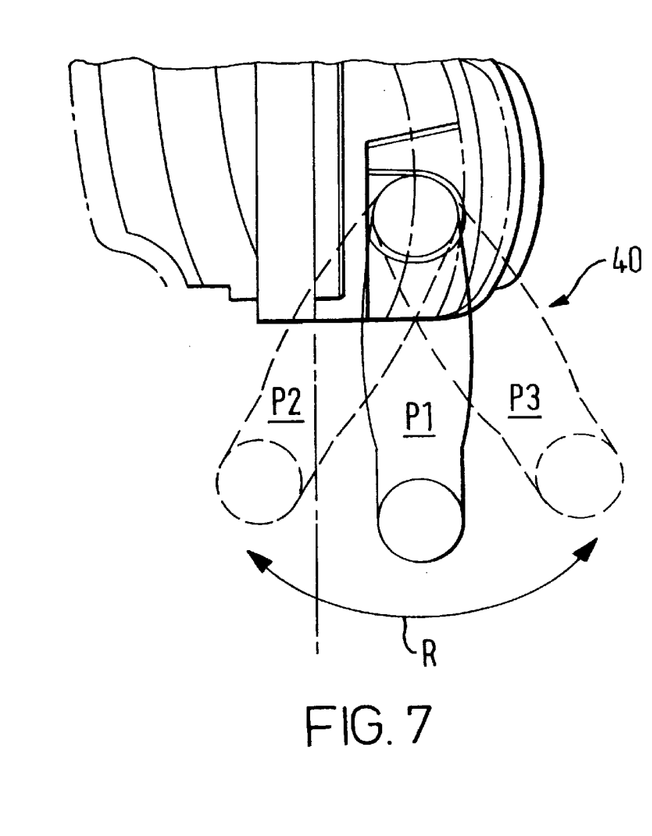
FIG. 7 shows a view indicated by arrow D in FIG. 6.

Each hinge unit 50a–d is identical and is internally constructed such that, at predetermined angular orientations, its shaft 42 occupies a favoured, rest position. Between these rest positions, the rotation of the shaft 42 is freewheeling. This is illustrated in FIG. 7. The second attachment loop 40 is shown in three rest positions. Position P1, in continuous lines, and positions P2 and P3 in dotted lines. During rotation of the second attachment loop as indicated by the arrow R, if external forces applied by the user are removed when the attachment loop 40 is in any of positions P1, P2 or P3, it tends to remain at that position. On the other hand, if the attachment loop 40 is between rest positions P1, P2 or P3, it is free to converge under the weight of the attachment loop to one of the rest positions, where it remains. Although not shown, the second attachment loop has a rest position in which it sits in the groove 13b on the bottom side 12b of the housing 12 assuming an idle position.

Referring to FIG. 4, the bar 32 of each attachment loop 30, 40 is identical in construction. The length of the bar can be extended from its length in FIG. 4 to a greater length permitting the withdrawal of the shafts 52 from their respective cup portions 37 and hence removal of the attachment loops 30, 40. In more detail, the bar 32 comprises an outer tube 33 within which end portions 34 of the arms 36, 38 are slidably mounted. The end portions 34 include a short slot 34a within which a pin 33a formed on the outer tube 33 may travel. A spring 35 connecting the end portions 34 of the arms 36, 38 stiffly biases the attachment means into this position. By applying a relatively large outward pulling force to, say, the arm 38 of the second attachment means 40, the end portion 34 of the arm 38 can be drawn out telescopically from the tube 33, to an extent permitted by the engagement of the slot 34a and the pin 33a, thereby effectively increasing the length of the bar 32 withdrawing the shaft clear of the cup portion 37 enabling the attachment loop to be removed.

Figure 2:
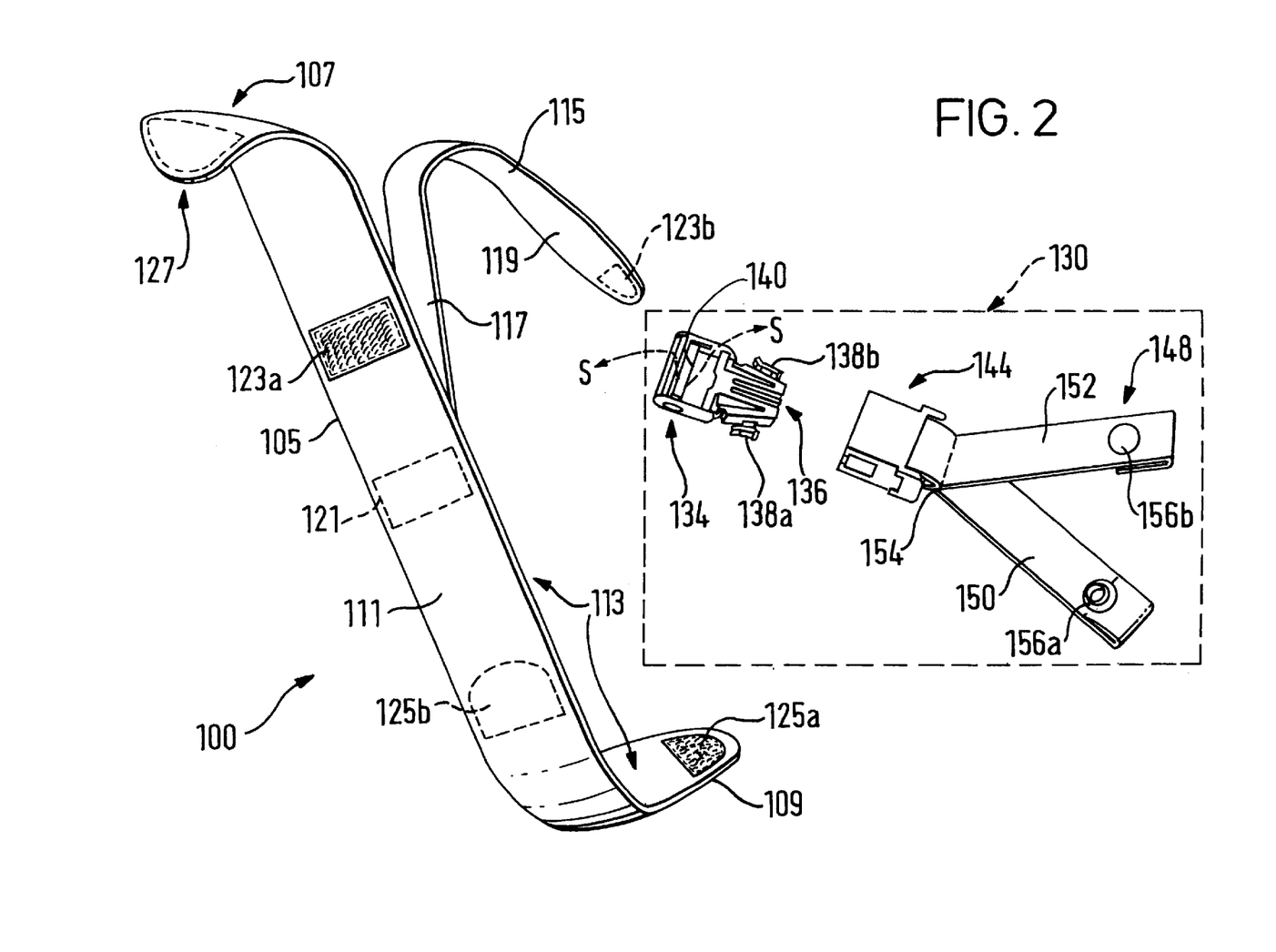
FIG. 2 shows an exploded or disassembled view of a carrier in accordance with a preferred embodiment of the present invention.

Referring to FIG. 2, a carrier 100 for a cellular radiotelephone is shown. The carrier 100 comprises a handstrap portion 105 comprising a strip of elastic material or webbing having a first end 107 and an opposite second end 109, and inner and outer faces 111 and 113, respectively. In FIG. 2, the inner face 111 is mainly visible. A further strap portion 115 projects dependently from the outer face 133 of the handstrap portion 105 from a region centrally located between the first and second ends 107,109. The strap portion 115 is inelastic and narrower in width than the handstrap 105. It is secured in position by being sandwiched between the handstrap portion 105 and a leather pad 121 which is stitched to the outer face thereof. Stitches pass through the strap portion 105 too. The leather pad can bear a logo or name, for example, that of the telephone manufacturer or service provider. No logo or name is shown in FIG. 2. The inner and outer faces of the strap portion 115 are labelled 117 and 119, respectively. A first two-part velcro fastener comprises a first velcro fastener 123a on the outer face 111 of the handstrap portion 105 and a mating second velcro fastener 123b (shown in dotted outline in FIG. 2) on the inner face 117 of the strap portion 105. A second two-part Velcro fastener comprises a first Velcro fastener 125a and a mating second Velcro fastener 125b positioned spaced apart from one another at the second end 109 of the handstrap portion 105. At the first end 107 of the handstrap portion 105, a protective tab 127 is provided on the outer face thereof. The Velcro fasteners 123,125 and the tab 127 are secured by stitching.

The carrier 100 also comprises a hanging assembly 130. The hanging assembly comprises a two part plastic connector 132 and a belt-loop connector 148. The connector 132 comprises a base portion 134 and a disconnectable portion 144. The base portion 134 includes a male portion 136 for push-fit insertion into the disconnectable portion 144. The male portion includes a pair of wings 138a, 138b which can be squeezed to towards one another to enable the two portions 134,144 of the connector to be separated. The base portion also includes a means by which the connector can be coupled to the strap portion 115. The means includes a shaft 140 which is loosely mounted to the framework of the base portion 134. By threading the strap portion 105 about the shaft 140 in the way illustrated by dotted arrowed line S the base portion 134 can be threadingly mounted to the strap portion 105. The disconnectable portion 144 also includes a shaft (not visible in FIG. 2) about which a belt connector 148 is attached. In more detail, the belt connector 148 comprises a strip of inelastic material similar to the strap portion 105 having inner and outer faces 150, 152 respectively. The belt connector is folded around the shaft of the disconnectable portion of the connector 132 and secured in place by stitching. The free ends of the strip material are folded back on themselves and provided with a pair of conventional pop fasteners, one male fastener 156a and one female fastener 156b.

Figure 3:
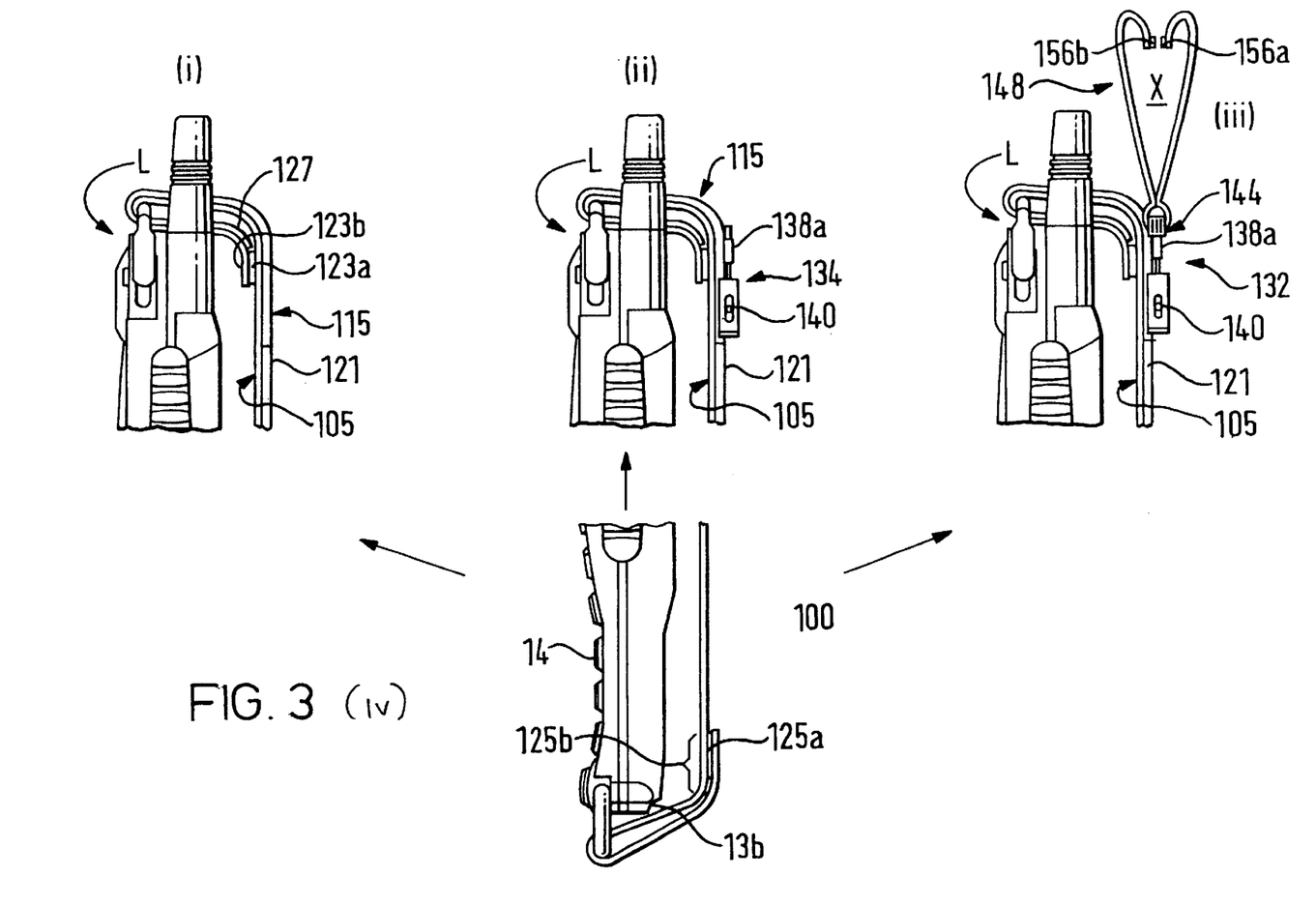

The drawings of FIG. 3 show the carrier 100 attached to the radiotelephone in various configurations. Because, in each configuration, the connection of the carrier 100 to the attachment loop 40 is the same, this is shown only once in FIG. 3(iv). Referring to FIG. 3(iv), the carrier is attached via the second end 109 of the handstrap portion 105 to the attachment loop 40 by simply threading it through the attachment loop and looping it back around the bar, such that the bar is encircled, and fastening the parts of the second velcro fastener 125a, 125b together. For diagramatic clarity, the attachment loop 40 is shown extending vertically downwards. However, when the first end 107 of the handstrap portion 105 is attached to the attachment bar 30, as is about to be described variously, the tension in the handstrap portion 105, in practice, pulls the attachment bar into a position more like that shown in FIG. 1.

FIG. 3(i) shows the first end 107 of the handstrap portion 105 connected to the attachment loop 30 when the hanging assembly 130 has been removed. To make this connection, the first end 107 of the handstrap portion 105 and the strap portion 115 are together passed over the bar 32 and together threaded back through the attachment loop 30, as illustrated by the arrow L, to enable the parts of the first velcro fastener 123a, 123b to join together, i.e. enabling the fastener 123b on the end of the strap portion 115 to join with the fastener 123a on the handstrap portion 105. The pad 127 on the first end 107 of the handstrap portion may or may not be partially sandwiched between the first Velcro fasteners 123a,123b.

FIG. 3(ii) shows the first end 107 of the handstrap portion 105 connected to the attachment loop 30 when the base portion 134 of the connector 132 is fitted. Here the connection process is the same except there is the further initial step of the base portion 134 of the connector 132 being threaded onto the strap portion 115.

FIG. 3(iii) shows connection the first end 107 of the handstrap portion 105 to attachment loop 30 when the whole hanging assembly 130 has been fitted. This differs from FIG. 3(ii) only in that the second portion 144 of the connector has been connected to the first base portion 134.

It will be appreciated that in any of the FIG. 3 configurations, the user will be able to use the carrier 100 in the hand-carry mode, in which mode the user is able to hold the telephone 10 in his palm in the normal way with his fingers passing between the handstrap portion 105 and the back of the telephone. In this position, the handstrap portion 105 serves to urge the telephone 10 into the palm of the user. Should the user release or lose his hold of the telephone, the strap 100 serves to retain the telephone in contact with the hand, thereby providing auxiliary support for the telephone.

If the user wishes to have the capability to use the handsfree mode of support then the FIG. 3(iii) configuration must be adopted. In the handsfree mode, the belt connector 148 is clipped around a belt (not shown) such that the belt is confined in the region labelled X in FIG. 3(iii). When in the handsfree mode, if the user wishes to make call, he has two choices. He can unclip the belt connector by unpopping the fasteners 156a and 156b or, he can squeeze the wings 138a and 138b together and disconnect the second portion of the connector 144 from the base portion 134 bringing the carrier into its FIG. 3(ii) condition. Of course, the latter approach has the advantage that the telephone 10 can very rapidly restored to the handsfree carry mode after the call has been made.

Figure 8:
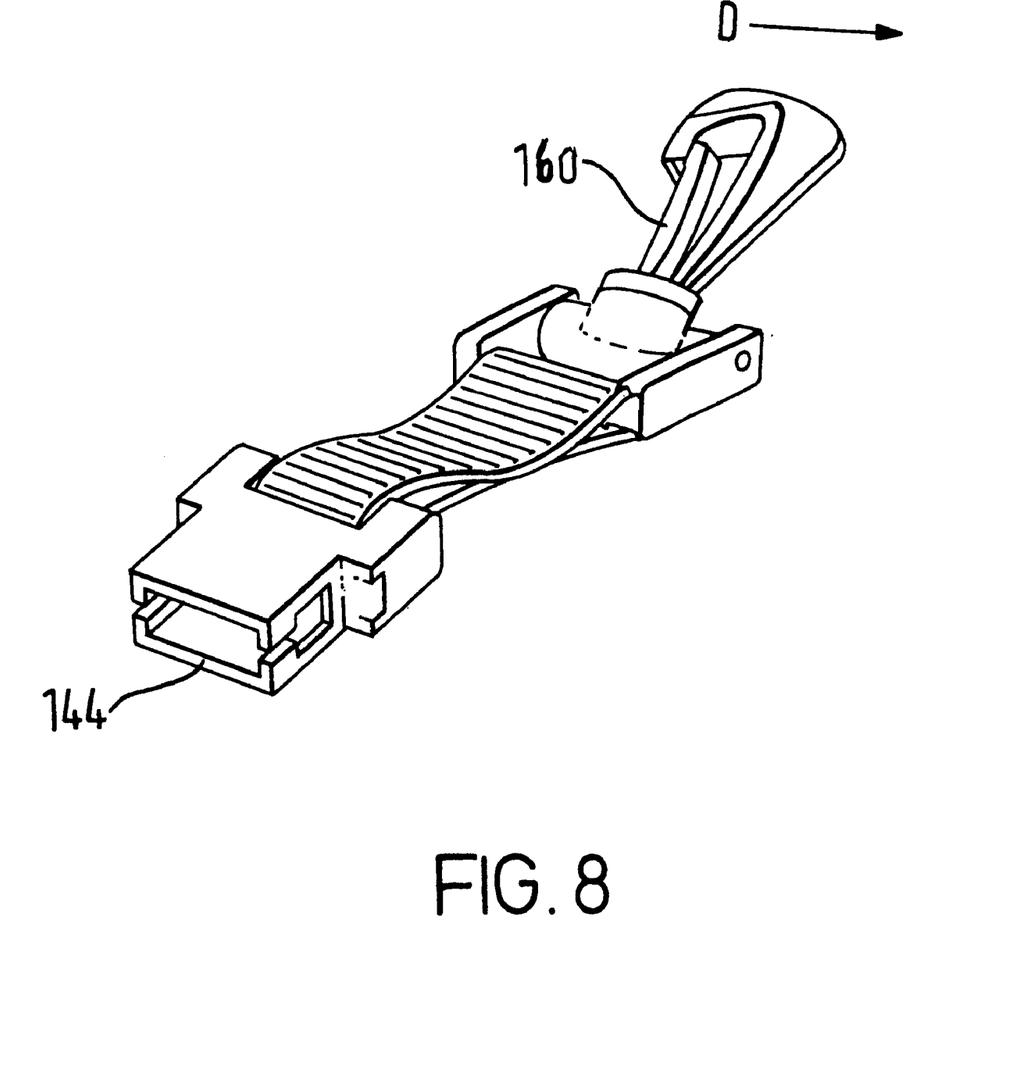
FIG. 8 shows an alternative accoutrement-connection means.

FIG. 8 shows an alternative accoutrement-connection means showing a conventional connector suitable for connection to a belt-loop or a loop found on a bag or the like. The member 160 is biased into the position in FIG. 8 but can by the application of a an inwardly directed force indicated by the arrow D, pivot the member 160 in a clockwise direction from the FIG. 8 view to enable connection/disconnection.

From the discussion above, it will be appreciated that the carrier of the present invention enables the user to carry the radiotelephone 10 in a number of different ways according to the situation and to his needs or preferences.

Furthermore, the user can remove the strap 100 altogether. The user may then choose to fit another strap. Alternatively, if either (or even both) attachment loop 30, 40 is not required it can either be removed completely or withdrawn into its idle position (i.e. in the idle position, for the attachment loop 30, the bar 32 sits in the groove 13a and for the attachment loop 40, the bar 32 sits in the groove 13b) so as not to interfere with the user's normal use of the telephone. Even if the user does not take the trouble to move the attachment loops into their respective idle positions, they are not prone to rattling caused by rotational movement because of the favoured, rest positions of the hinge units 50a–d, as previously described. Furthermore, the first attachment loop is not prone to rattling because of the linear displacement of the hinge units 50c, 50d because of the tight frictional fit between the hinge units 50c ,50d and the hinge carrier 46.

In other embodiments, the hinge units may simply be spring biased to a single predetermined position to avoid rattling.

What is claimed is:

1. A carrier for a handportable cellular telephone for use in a wireless telecommunications network comprising:

handstrap means connectable to first and second ends of the cellular telephone, said handstrap means serves to urge the cellular telephone towards direct adjacent contact with one of the hands of a user, when the cellular telephone is being used; and hanging means separable from said handstrap means so as to be releasably attached to a portion of said handstrap means adjacent to one of said first and second ends of said cellular telephone, said hanging means serves to make the career releasably hangable, in a handsfree manner, from the user's accoutrements.

2. A carrier as in claim 1, wherein the handstrap means comprises a handstrap portion having first and second ends and the hanging means comprises a strap depending from the handstrap portion intermediate its first and second ends, wherein the first end of the handstrap portion and the distal end of the depending strap are for providing wrap-around connection to a bar of the radiotelephone.

3. A carrier as in claim 2, wherein the handstrap portion at its first end comprises one of the first pair of mating fasteners and the depending strap comprises at its distal end the other of the first pair of mating fasteners, the first pair of mating fasteners serving to maintain the wrap-around connection.

4. A carrier as in claim 1, wherein the hanging means comprises:

a hanging assembly removably attached to the carrier.

5. A carrier as in claim 4, wherein the handstrap means comprises:

a handstrap portion having first and second ends, and wherein the hanging means comprises:

a strap depending from the handstrap portion intermediate its first and second ends, wherein the first end of the handstrap portion and the distal end of the depending strap are for providing wrap-around connection to a bar of the radiotelephone, and wherein the hanging assembly is removably threaded on the depending strap.

6. A carrier as in claim 4, wherein the hanging assembly comprises:

accoutrement-connection means.

7. A carrier as in claim 6, wherein the hanging assembly comprises:

accoutrement-connection means, and wherein the hanging assembly comprises:
a connector having a first base portion through which the depending strap is removably threaded and a second removable portion attached to the accoutrement-connection means.

8. A carrier as in claim 7, wherein the second portion of the connector and the accoutrement-connection means have been removed.

9. A carrier as in claim 4, wherein the hanging assembly has been removed.

10. A cellular telephone for use in a wireless telecommunications network comprising:
a housing having first and second carrier attachment means disposed at first and second ends of the housing: and
a carrier,
wherein said carrier comprises:
handstrap means connected to first and second carrier attachment means, said handstrap means serves to urge the cellular telephone towards direct adjacent contact with one of the hands of the a user, when the cellular telephone is being used, and
hanging means separable from said handstrap means so as to be releasably attached to a portion of said handstrap means adjacent to one of said first and second carrier attachment means of said cellular telephone, said hanging means serves to make the radiotelephone releasably hangable, in a handsfree manner, from the user's accoutrements.

11. A cellular telephone as in claim 10, wherein said hanging means further comprises:
a strap depending from the handstrap means, wherein said first carrier attachment means comprises:
a bar, and
wherein the distal end of the depending strap and the second end of the handstrap portion are wrapped around the bar of the first carrier attachment means for connection thereto.

12. A radiotelephone as in claim 10, wherein the hanging means comprises:
a hanging assembly removably attached to the carrier.

13. A radiotelephone as in claim 11, wherein the hanging means is removably threaded on the depending strap.

14. A radiotelephone as in claim 12, wherein the hanging assembly has been removed from the carrier.

15. A radiotelephone as in claim 12, wherein the hanging assembly comprises:
an accoutrement-connection means.

16. A radiotelephone as in claim 15, wherein the handing assembly comprises:
a connector comprising a first base portion through which the depending strap is removably threaded and a second disconnectable portion to which the accoutrement-connection means is attached.

17. A radiotelephone as in claim 16, wherein the accoutrement-connections and the second portion of the connector have been removed.

18. A radiotelephone as in claim 10, wherein the carrier is removable from the radiotelephone.

19. A carrier as in claim 2, wherein the hanging means comprises:
a hanging assembly removably attached to the carrier.

20. A carrier as in claim 3, wherein the hanging means comprises:
a hanging assembly removably attached to the carrier.

21. A carrier as in claim 4, wherein the handstrap portion at its first end comprises:
one of the first pair of mating fasteners,
wherein the depending strap comprises:
at its distal end the other of the first pair of mating fasteners, the first pair of mating fasteners serving to maintain the wrap-around connection, and
wherein the hanging assembly is removably threaded on the depending strap.

22. A carrier as in claim 5, wherein the hanging assembly comprises:
accoutrement-connection means.

23. A carrier as in claim 5, wherein the hanging assembly has been removed.

24. A carrier as in claim 6, wherein the hanging assembly has been removed.

25. A carrier as in claim 7, wherein the hanging assembly has been removed.

26. A carrier as in claim 8, wherein the hanging assembly has been removed.

27. A radiotelephone as in claim 11, wherein the hanging means comprises:
a hanging assembly removably attached to the carrier.

28. A radiotelephone as in claim 12, wherein the hanging means is removably threaded on depending strap.

29. A radiotelephone as in claim 13, wherein the hanging assembly has been removed from the carrier.

30. A radiotelephone as in claim 13, wherein the hanging assembly comprises:
an accoutrement-connection means.

31. A radiotelephone as in claim 11, wherein the carrier is removable from the radiotelephone.

32. A radiotelephone as in claim 12, wherein the carrier is removable from the radiotelephone.

33. A radiotelephone as in claim 13, wherein the carrier is removable from the radiotelephone.

34. A radiotelephone as in claim 14, wherein the carrier is removable from the radiotelephone.

35. A radiotelephone as in claim 15, wherein the carrier is removable from the radiotelephone.

36. A radiotelephone as in claim 16, wherein the carrier is removable from the radiotelephone.

37. A radiotelephone as in claim 17, wherein the carrier is removable from the radiotelephone.

* * * * *